United States Patent
Murthy et al.

(10) Patent No.: US 8,970,613 B2
(45) Date of Patent: Mar. 3, 2015

(54) RENDER TREE CACHING

(75) Inventors: Giridhar Sreenivasa Murthy, Sunnyvale, CA (US); David Hayward, Los Altos, CA (US); Alan B. Heirich, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 13/533,364

(22) Filed: Jun. 26, 2012

(65) Prior Publication Data

US 2013/0328898 A1 Dec. 12, 2013

Related U.S. Application Data

(60) Provisional application No. 61/656,440, filed on Jun. 6, 2012.

(51) Int. Cl.
  *G09G 5/36* (2006.01)
  *G06T 1/60* (2006.01)
(52) U.S. Cl.
  USPC .......................................... 345/557; 345/530
(58) Field of Classification Search
  CPC ............. G06T 1/60; G06T 5/36–5/366; G06T 1/00–1/0092; G06T 15/00
  USPC ......................... 345/530, 557, 522
  See application file for complete search history.

(56) References Cited

U.S. PATENT DOCUMENTS

| 7,146,371 | B2 * | 12/2006 | Hofstee et al. ........................ 1/1 |
| 2004/0225996 | A1 * | 11/2004 | Venkatesan et al. .......... 717/100 |
| 2006/0145895 | A1 * | 7/2006 | Venkatesan et al. ............ 341/50 |
| 2006/0145896 | A1 * | 7/2006 | Venkatesan et al. ............ 341/50 |
| 2010/0026682 | A1 * | 2/2010 | Plowman et al. ............. 345/419 |
| 2010/0328326 | A1 * | 12/2010 | Hervas et al. ................. 345/522 |
| 2010/0328327 | A1 * | 12/2010 | Hervas et al. ................. 345/522 |
| 2010/0329564 | A1 * | 12/2010 | Hervas et al. ................. 382/190 |

* cited by examiner

*Primary Examiner* — Jacinta M Crawford
(74) *Attorney, Agent, or Firm* — Wong, Cabello, Lutsch, Rutherford & Brucculeri, LLP

(57) ABSTRACT

GPU fragment programs can be used to render images in a computer system. These fragment programs are generated from render trees, which specify one or more filters or functions to be applied to an input image to render an output image. It is not uncommon for successive frames to require application of substantially the same filters. Therefore, rather than regenerate and recompile new fragment programs for successive corresponding render trees, the render trees are substantially uniquely identified and cached. Thus, when a render tree is received, it can be identified, and this identifier (such as a hash) can be used to determine whether a corresponding fragment program has already been generated, compiled and cached. If so, the corresponding cached fragment program is retrieved and executed. If not, a fragment program for the newly received render tree is generated and cached.

25 Claims, 6 Drawing Sheets

High-level Code Examples:

1. Allocate 51

2. Apply 52 to 51, parameters = (X, Y, Z, W), input = 51 (Sea Shore image), output = [place holder] CC sea shore 3. Apply 53, parameters (X, Y, Z, W), input = cc sea shore, output = [place holder] FC CC sea shore 4. Apply 54, parameters (X, Y, Z, W), input buffer 53, input Sea Shore image, output = [place holder] sea shore result

RENDER TREE CACHING

CROSS-REFERENCE TO RELATED APPLICATIONS

This application is a continuation application which claims priority to U.S. Provisional Patent Application Ser. No. 61/656,440 filed 6 Jun. 2012, entitled "Render Tree Caching" and which is hereby incorporated by reference in its entirety.

BACKGROUND

Over the past several years there have been increasing demands placed upon graphics subsystems in all variety of hardware. For example, in the general computing area, even traditionally mundane programs, like presentation software, are including animation and other tools that are requiring faster and more complex graphics computation. In addition, the traditional graphics-intense applications like video, photo editing and gaming are growing both in scope and graphics-intensity.

During this same time period, hardware manufacturers have sought to meet and exceed the growing demand with dedicated programmable graphics processors having ever-increasing capability. While both programmable and non-programmable GPUs offer enhanced speed for graphics calculations, programmable GPUs differ in that they offer a high measure of flexibility. In practical terms, programmability is an important advantage because it allows programs to use the graphics chip in ways similar to the system microprocessor. By using the GPU this way, the system can generate virtually infinite graphics effects without loading the system CPU.

Programmable GPUs run programs that are generally called fragment programs. The name "fragment" program derives from the fact that the unit of data being operated upon is generally a pixel, i.e., a fragment of an image. The GPUs can run a fragment program on several pixels simultaneously to create a result, which is generally referred to by the name of the buffer in which it resides. GPUs use data input generally called textures, which is analogous to a collection of pixels.

As computers migrate toward more visually rich content, image processing becomes more important. As a consequence, the programmer's ease of accessing these tools and the efficiency of graphics calculations continues to grow in importance. It is therefore desirable to have an abstraction layer that hides the complexity of graphics hardware from those exploiting that infrastructure. Furthermore, operating systems may wish to facilitate an overall rich user graphics experience by presenting such an abstraction layer to all applications. In Apple Inc.'s OS X operating system, such an abstraction layer is presented in the CoreImage framework.

In broad terms, the CoreImage framework allows a programmer or program to simply apply one or more filters or effects to a given image. This sequence of filters can be assembled into a graph-like description of an image rendering task. This description is known as a render tree. Once the render tree is created, a fragment program is generated compiled and linked to perform the required graphics operations. Although modern programmable GPUs are able to perform such functions quite quickly, it still requires a significant amount of time to generate, compile and link the fragment programs for each successive frame. However, it is not uncommon for the rendering of successive frames to require the use of substantially the same fragment programs. It would therefore be desirable to provide a way of reusing a previously generated, compiled, and linked fragment program to improve the speed of graphics rendering operations.

SUMMARY

The following disclosure teaches various methods and systems for the rendering of images using fragment programs executed by a GPU. More particularly, methods and systems for caching and reusing fragment programs are described. There are two basic aspects to caching and reusing fragment programs: identifying render trees from which the fragment programs are generated (so that a corresponding fragment program can be identified) and caching the fragment programs for later retrieval.

Identifying render trees from which the fragment programs are generated can be done by computing a hash function on the render tree. The render tree generally specifies one or more filters (i.e., functions) to be applied to an input image to generate an output image. In some embodiments, it is desirable to compute the hash function on an optimized tree, which has been reformulated improve execution time, memory footprint, etc., which can include such things as removing unnecessary operations, combining operations, etc. However, the hash function can also be performed on a non-optimized render tree. In either case, the hash function is preferably performed on the filter nodes themselves, and not on any associated parameters. Additionally, in most cases, it is preferable that the hash function be sensitive to the order of the applied filters.

Once the hash value of a render tree is determined, the hash value is compared to the hash values of render trees used to generate one or more previously generated fragment programs that have been cached for reuse. If a match is found, this indicates that a fragment program for computing the received render tree has previously been generated and compiled. In such a case, the cached render tree is retrieved and executed, thereby saving the steps of generating and compiling a new fragment program. If no match is found, this indicates that a fragment program for computing the received render tree has not recently been generated and compiled. Thus it is necessary to generate and compile a new fragment program, which can then be added to the cache for future reuse.

Preferably the cache is maintained by storing some number of most recently used fragment programs along with the hash values of the render trees from which they were generated. The cache can be managed as a most recently reused cache, with fragment programs that have not been recently reused being removed from the cache as new, more recently used fragment programs are added.

All of these functions can be implemented in a variety of computer systems. Preferably they are implemented as part of an operating system service that is available to client programs or programmers as part of a graphics rendering operation.

DETAILED DESCRIPTION

A. Technology and Nomenclature

1. Hardware

The inventive embodiments described herein may have implication and use in all types of computing systems. Most of the discussion herein focuses on a common computing configuration having a CPU resource and a GPU resource. The discussion is only for illustration and not intended to prevent the application of the invention to other systems having either: no GPU, multiple CPUs and one GPU, multiple GPUs and one CPU or multiple GPUs and multiple CPUs. With that caveat, a typical hardware and software operating environment are described.

Figure 1:
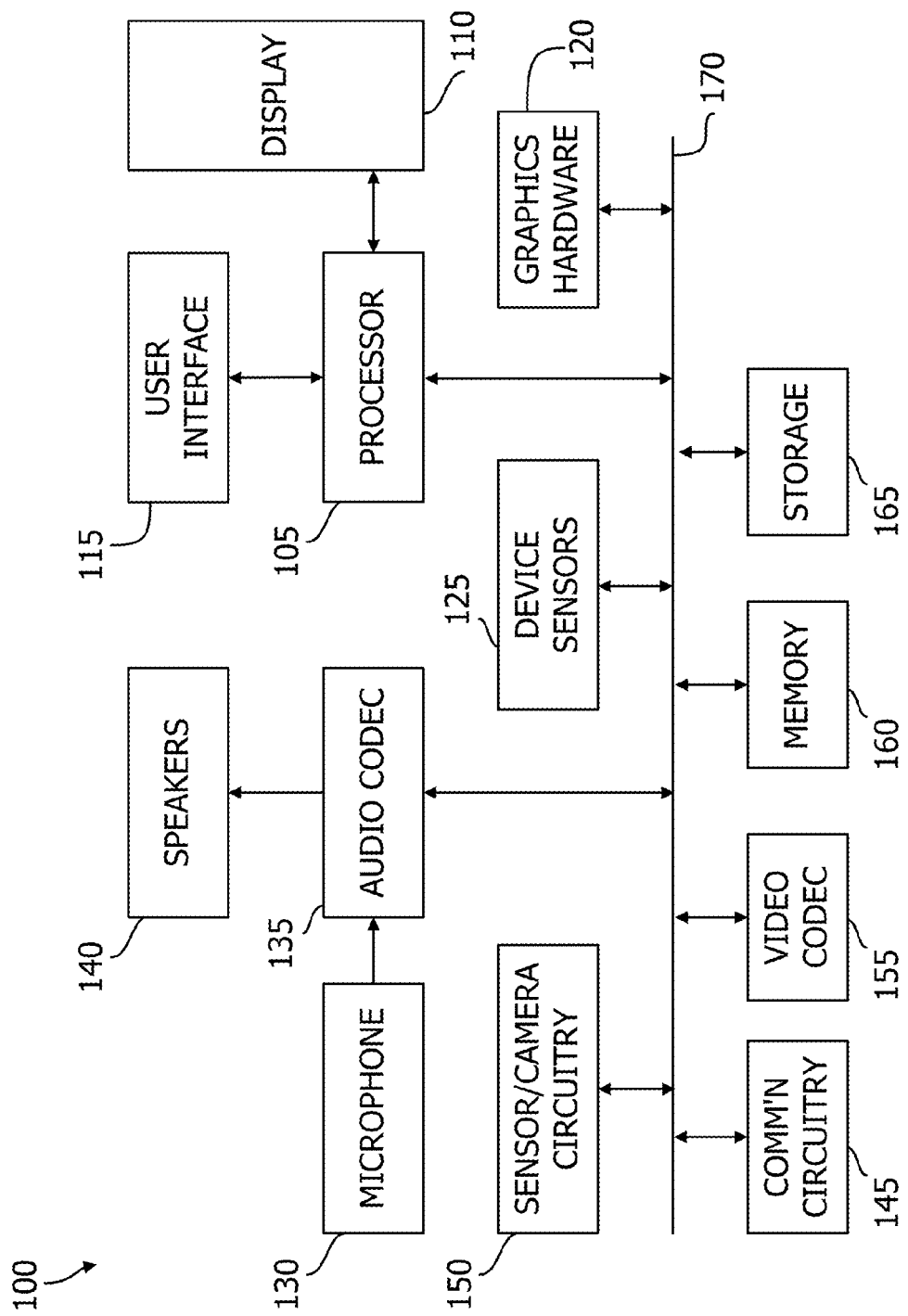
FIG. 1 illustrates a sample hardware configuration.

Referring to FIG. 1, a simplified functional block diagram of an illustrative electronic device 100 is shown according to one embodiment. Electronic device 100 may include processor 105, display 110, user interface 115, graphics hardware 120, device sensors 125 (e.g., proximity sensor/ambient light sensor, accelerometer and/or gyroscope), microphone 130, audio codec(s) 135, speaker(s) 140, communications circuitry 145, digital image capture unit 150, video codec(s) 155, memory 160, storage 165, and communications bus 170. Electronic device 100 may be, for example, a personal digital assistant (PDA), personal music player, mobile telephone, notebook, laptop or a tablet computer, desktop computer, or server computer. More particularly, any of the sending devices, receiving devices, and remote sources described above may take the form of device 100.

Processor 105 may execute instructions necessary to carry out or control the operation of many functions performed by device 100. Processor 105 may, for instance, drive display 110 and receive user input from user interface 115. User interface 115 can take a variety of forms, such as a button, keypad, dial, a click wheel, keyboard, display screen and/or a touch screen. Processor 105 may also, for example, be a system-on-chip such as those found in mobile devices and include a dedicated graphics processing unit (GPU). Processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 to process graphics information. In one embodiment, graphics hardware 120 may include a programmable graphics processing unit (GPU).

Sensor and camera circuitry 150 may capture still and video images that may be processed, at least in part, by video codec(s) 155 and/or processor 105 and/or graphics hardware 120, and/or a dedicated image processing unit incorporated within circuitry 150. Images so captured may be stored in memory 160 and/or storage 165. Memory 160 may include one or more different types of media used by processor 105 and graphics hardware 120 to perform device functions. For example, memory 160 may include memory cache, read-only memory (ROM), and/or random access memory (RAM). Storage 165 may store media (e.g., audio, image and video files), computer program instructions or software, preference information, device profile information, and any other suitable data. Storage 165 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 160 and storage 165 may be used to tangibly retain computer program instructions or code organized into one or more modules and written in any desired computer programming language. When executed by, for example, processor 105 such computer program code may implement one or more of the methods described herein.

2. Software

As noted above, the systems and methods disclosed herein include software. As such, a description of common computing software architecture is provided as expressed in layer diagrams of FIG. 2. Like the hardware examples, these are not intended to be exclusive in any way but rather illustrative. This is especially true for layer-type diagrams, which software developers tend to express in somewhat differing ways. In this case, layers are expressed starting with the O/S kernel, lower level software and firmware is omitted. The notation is generally intended to imply that software elements shown in a layer use resources from the layers below and provide services to layers above. However, in practice, all components of a particular software element may not behave entirely in that manner.

Figure 2:
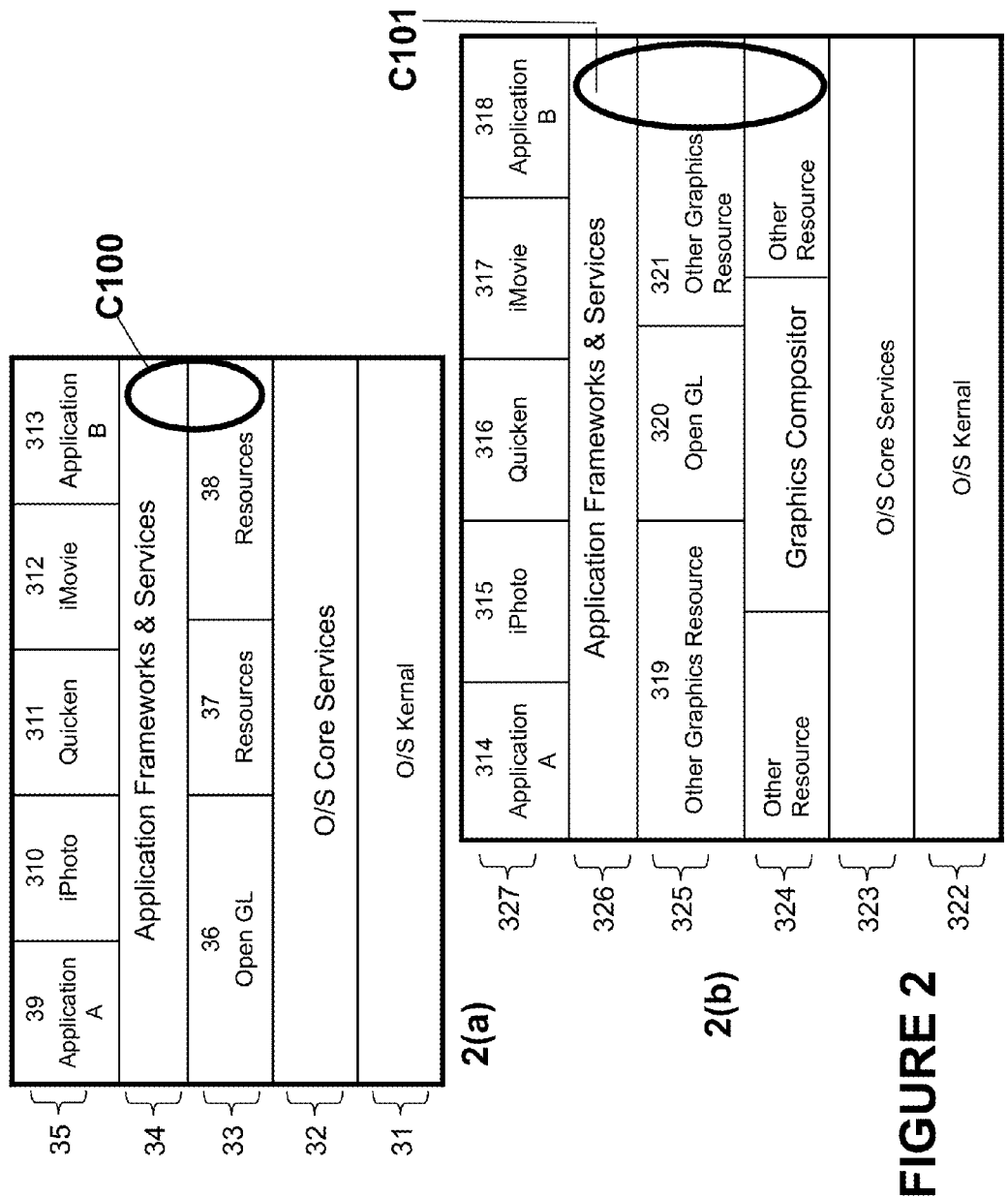
FIG. 2 illustrates an example software stack

With those caveats regarding software, referring to FIG. 2, section 2(a), layer 31 is the O/S kernel, which provides core O/S functions in a highly protected environment Above the O/S kernel, there is layer 32 O/S core services, which extend functional services to the layers above such as disk and communications access. Layer 33 is inserted here to show the general relative positioning of the OpenGL library and similar resources. Layer 34 is an amalgamation of functions typically expressed as two layers: applications frameworks and application services. For purposes of our discussion, both these layers provide high-level and often functional support for application programs with reside in the highest layer shown here 35. Item C100 is intended to show the relative positioning of CoreImage framework a software suite and moniker for the graphics system of Apple's OS X and iOS operating systems that can be used to implement the teachings disclosed herein.

Referring now to section 2(b) of FIG. 2, item C101 represents the relative positioning of the CoreImage framework. It is evident in the diagram 2(b) that, by comparison to 2(a), a layer has been added 324 for another graphics function—compositing. It is the compositor's job to perform window composition and management in a windowing system, like that which is discussed for many embodiments. Additional aspects of the CoreImage framework operating system service in which the concepts described herein may find application are described in U.S. patent application Ser. No. 10/826,762, titled "High-Level Program Interface for Graphics Operations," filed Apr. 16, 2004, ("the '762 application), which is hereby incorporated by reference.

3. Logical Constructs

Figure 3:
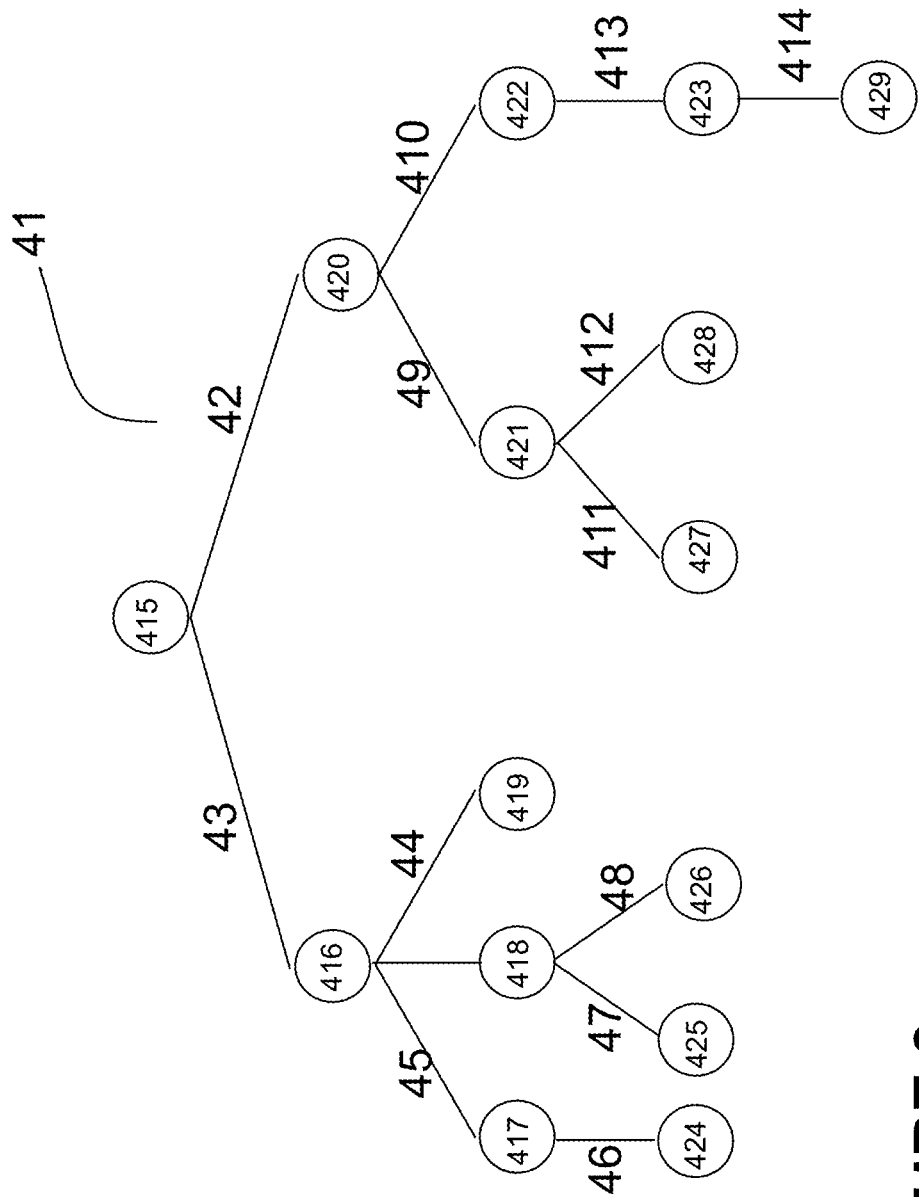
FIG. 3 is an example render tree.

In mathematics and other computational sciences, problems may be expressed in a parsed fashion, which lends itself to machine-performed computation and the programming of such machine. An example of parsed expression is a generalized tree structure such as that shown in FIG. 3. Referring to FIG. 3, tree structure 41 is comprised of: links, which represent the result of the nearest subservient node (42, 43, 44, 45, 46, 47, 48, 49, 410, 411, 412, 413 and 414); and two types of nodes. There are leaf nodes that represent pre-existing computational input (e.g. operands), 419, 424, 425, 426, 427, 428 and 429. Alternatively, there are functional nodes that represent computational functions (e.g. operators) 415, 416, 417, 418, 420, 421, 422 and 423. As an overall example, referring to FIG. 3, link 46 serves as an input to functional node 417 and represents the result of leaf node 424 (the result of a leaf node, simply being the leaf).

Figure 4:
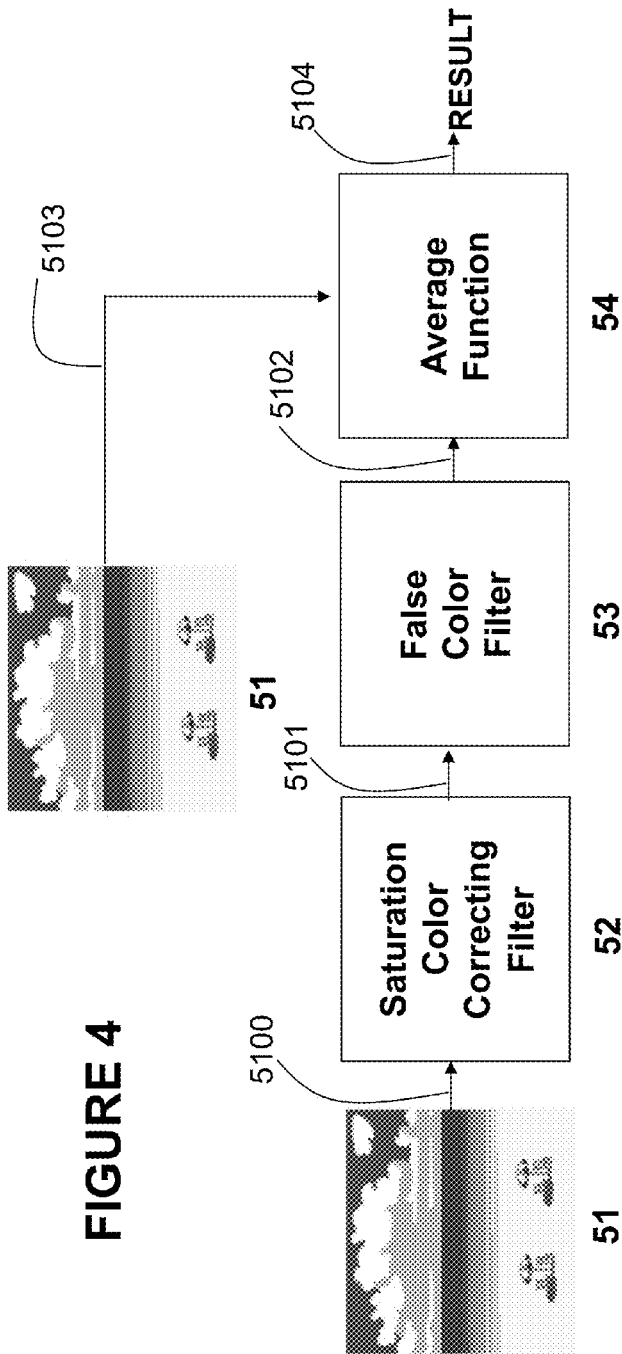
FIG. 4 is another example of a render tree or graph and corresponding sample program steps.

Referring now to FIG. 4, another tree is shown using rectangular nodes rather than circles. However, the representative nature of the diagram is the same: leaf nodes 51 are analogous to operands; functional nodes 52, 53, and 54 represent operators, and the links 5100, 5101, 5102, 5103 and 5104 represent results.

At various places in this disclosure trees like those in FIGS. 3 and 4 are used, and those trees are discussed in the context of "graphs" being used or assembled within a computer system. This description is not necessarily intended to imply that the computer system is constructing or using the graphical tree that is pictured, but rather that the system makes, maintains or uses some representation of the graphical tree that we draw for human illustrative purposes.

Additionally, the description below at times refers to various object oriented programming structures. Among the relevant objects are images and filters. Images are either the two dimensional result of rendering (a pixel image) or a representation of the same. In high-level program operations, we often maintain objects that represent images in that those objects require computation to become the actual pixel values. In a general sense, during discussions relating to filters, images should be interpreted as inputs to a function or filter. Filters are high-level functions that are used to affect images. Filters may be analogized to fragment programs, which similarly affect images (or more precisely, typically textures), however producing only one pixel at a time. There is not necessarily a one-to-one correspondence between filters and fragment programs. For example, a filter may involve application of a series of fragment programs to an image. Additionally, besides the images on which they operate, filters may also have other parameters that serve as an input to the filter. In FIG. 4, these input parameters are illustrated as a vector "parameters (X,Y,Z,W) to represent generic inputs (see FIG. 4)." Another and less generic example would be a blur filter, which would nearly certainly require the radius of a blur as an input parameter. Yet other examples are input color, input intensity, input saturation, etc.

B. Underlying Concepts

In a general sense, image processing using a typical programmable GPU may be accomplished by either (1) using a pre-defined filter or (2) by assembling a series of pre-defined filters. In the latter case, the programmer or program generally assembles a list of descriptions or references of filters or functions to be applied to an image into a data structure that referred to herein as a graph or render tree. The graph or render tree defines relationships between the pre-defined filters and images being employed in the new filter. When the programmer or program has completed building this render tree, all the information necessary to create the fragment program is embodied in the graph or render tree. It is then necessary for the computer system to compile this graph or render tree into a fragment program executable by the GPU. This task can be handled by an operating system service, such as the CoreImage framework in Apple's OS X, although it is also possible for other programs or operating systems components to perform this task. For purposes of the foregoing description, the operating system service or other component that performs these graphics functions is referred to as a "graphics service," with the understanding that this service may be implemented in a variety of ways. The program or programmer that is generating a render tree for the graphics service will be referred to as a "client," with the understanding that the client can be a programmer, a user application, or a lower level application.

In many embodiments, it may be preferable to optimize the render tree before compiling. Optimization is the process of analyzing and changing a program or task so that when the task is actually performed, it is performed most efficiently or easily. In many embodiments, the graphics service can be configured to perform this function. Generally, there are four different general techniques for optimizing. Those four general techniques are: caching of intermediary results; limiting computation and storage to the domain of definition; limiting computation and storage to the region of interest; and graph re-writing to reduce or simplify the graph. This latter technique can, for example, include re-ordering and/or combining filters to reduce a number of computations or memory read/write events that are required. Further aspects of these techniques are described in more detail in the '762 application referenced above.

As noted above, the optimization and compiling has traditionally been done just prior to execution. However, sequential image frames often require application of similar or even identical render trees. Because the optimization, compiling, and linking of the fragment programs require significant amounts of time, it would be desirable to reuse these fragment programs where possible. Reuse of these fragment programs requires a way to identify fragment programs that have previously been compiled and linked, as well as a mechanism for storing the fragment programs so that they may be used by future frames.

1. Identifying a Tree.

Reuse of previously compiled fragment programs necessitates being able to determine when a newly received render tree corresponds to a previously compiled fragment program. This can be accomplished by computing a hash function on the render tree. A hash function is an algorithm that reduces a data set of a relatively large and typically variable length to a relatively smaller data set, while preserving the ability to identify the underlying data set. In many embodiments, a hash function will produce an output of fixed length. When a data set is input into a hash function, the output can be referred to as a hash value, hash code, hash, checksum, or other similar terminology.

In general, the hash value can be thought of as a "fingerprint" of the underlying data set. Some hash functions will produce a unique hash value for any given data set. Even if a hash function does not produce a unique hash for any possible input data set, a hash function may still be selected so that the probability of two different valid inputs generating the same hash value is sufficiently small that the resulting hash value is effectively unique. In other words, a small amount of data can be used to uniquely identify a larger, more complex underlying data set (in this case, a render tree). The MD5 hash algorithm is suitable for use with the methods and systems described herein.

Additionally, there are other aspects of applying a hash function to a render tree that merit discussion. As noted above, a render tree can specify functions or filters to be applied to an image as well as parameters that affect the application of these filters. For example, a blur filter may include parameters specifying the radius of the blur. Alternatively, a color transforming filter may specify specific parameters for the underlying color change. It may be preferable for the hash function to operate on the filters alone, and not on any additional parameters that are specified with the filter. The reason for this is that the compiled fragment program need not include the argument parameters of the various filters, as these can be passed to the compiled fragment program at the time of execution on the GPU. Additionally, it is not uncommon for a render tree to be applied in successive frames in which the render tree applies the same filters but with different parameters. If the hash function operates on the parameter portions of the render tree, instead of just the filters themselves, it will identify two trees applying the same filters with different parameters as requiring different fragment programs, when this is not actually the case. Conversely, if the hash does not operate on the parameters of the filters, two render trees applying the same filters with different parameters will produce the same hash function allowing the corresponding fragment program to be reused (as explained in more detail below).

Similarly, in some cases it may be desirable for the hash function to operate on the filters that make up the render tree without regard to the order in which the filters are applied. In some cases the output image result from a given input image and a series of filters can be the same or substantially the same without regard to the order in which the filters are applied. Like in the parameter example above, it would be preferable in such cases to have a hash function that recognizes the equivalence of a different sequence of the same set of operations as being an equivalent render tree and generates the same hash for each. (This will facilitate the use of a precompiled fragment program as discussed above.) However, it is not always the case that the resulting image is the same for any sequence of filter applications. Therefore, in some embodiments it may be desirable to have a hash function in which the order of the filters is taken into account. Alternatively, a hash function could be selected or designed that is able to parse the render tree in such a way that it can properly account for the cases in which the order of the filters does or does not matter and generate an appropriate hash accordingly. Such a hash function could also be designed in accordance with the optimization algorithms as set forth below.

As noted above, the render trees are typically optimized before a final fragment program is generated and compiled. Although it is possible to compute a hash function on an un-optimized render tree generated by the client, in many cases it may preferable to compute the hash after the render tree has been optimized. This may be the case for at least a couple of different reasons. For example, hash functions can be very computationally expensive. The optimization process will tend to reduce the size of the render tree, and thereby reduce the amount of data that the hash function needs to process. This can result in significant computational resource savings. Additionally, it is possible for two somewhat different un-optimized trees to each optimize to a tree that is functionally equivalent. In these cases the hashes for the two original trees would be different, even though each can use the same compiled fragment program. Moreover, the optimization process can be tailored to account for cases in which the sequence of filters applied matters and those in which it does not. Thus, the optimized render tree can be structured in such a way that the hash function can operated differently on the portions of the render tree that are sequence-sensitive and those in which it is not.

However, because optimization is itself computationally expensive, in some cases it may be desirable to apply the hash function to an un-optimized or only partially optimized render tree. This decision will depend on a number of different factors, including, for example, computational resources available for optimization versus hash computation, speed of execution of the GPU versus the resources used in optimization and hash computation, complexity of a given render tree, etc. A designer of a given system can apply these and other factors in the context of the constraints of his particular system to determine whether it is best to compute the hash on an optimized, partially optimized, or un-optimized render tree.

In general, the purpose of the hash function applied to the render tree is to substantially uniquely identify a render tree so that subsequent render trees that are functionally equivalent will have the same hash value so that a corresponding fragment program can be reused as set forth below. For purposes of this discussion, substantial uniqueness means that two render trees that are functionally equivalent will, to a probability appropriate to the system in question, have the same hash value, while two render trees that are not functionally equivalent will, to an appropriate degree of probability for the system involved, have different hash values.

2. Caching Previously Used Trees

In addition to a mechanism for substantially uniquely identifying previously used render trees, reuse of previously compiled fragment programs also requires a mechanism for storing previously used fragment programs so that they are accessible when needed again. Although a variety of different storage techniques are possible, one advantageous system is a cache of previously used render trees. Once the graphics service receives a render tree from a client, (optionally) optimizes the tree, and computes a hash for the tree, the hash value is compared to a list of recently used tree hash values. If a corresponding tree is found in the recently used list, then the corresponding fragment program (previously generated and compiled) is reused. Conversely, if a corresponding tree is not found, then a fragment program is generated and compiled. The newly generated fragment program and its corresponding hash are stored in a recently used tree cache, and the general process repeats itself.

The recently used tree cache can be any suitable memory. For example, the cache could be stored in system memory. Alternatively, a dedicated memory could be created, particularly in the case of custom GPUs and/or systems on a chip (SOCs). In any case, because the memory for recently used tree cache storage is limited, it will generally be preferable to store only a relatively small number of the most recently used fragment programs (corresponding to particular render trees). For example, it might be desirable to store five, ten, or a similar number of recently used fragment programs. Whenever a new render tree is received (and a new fragment program generated) the least most recently used tree stored can be replaced with the new fragment program. The exact mechanism of this cache can vary. Alternatively, fixed memory positions can be used for each of the most recently used fragment programs. As yet another alternative, a first available memory address can be used for a newly generated fragment program, and a pointer can be updated to indicate the position of the fragment program within the most recently used sequence.

C. Example Embodiment

Figure 5:
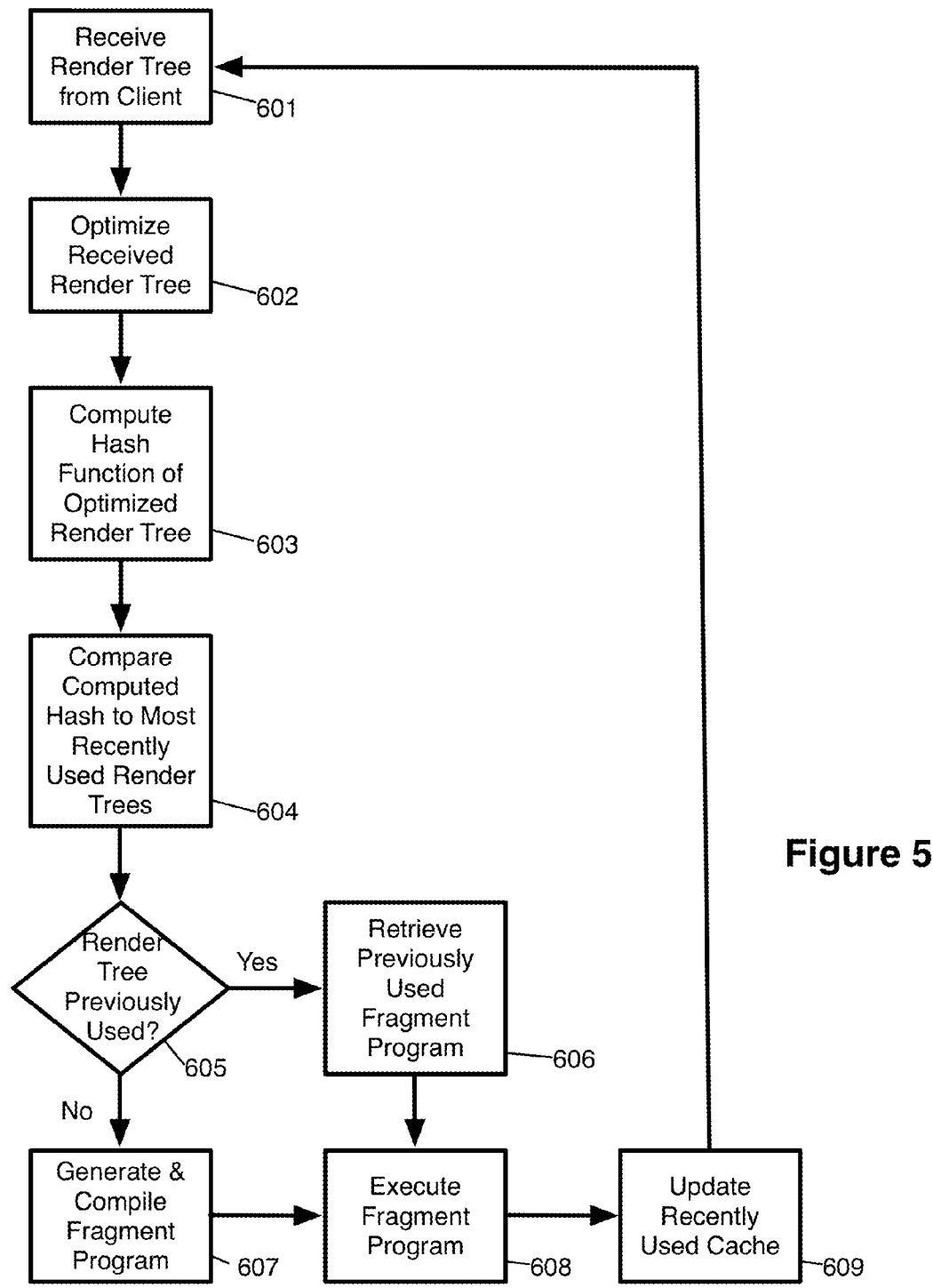
FIG. 5 is a flow chart illustrating a method of render tree caching.

FIG. 5 is a flowchart illustrating application of the above-described principles to a specific embodiment. The flowchart is intended to generally express an implementation of the above described principles by a graphics service. Initially, the graphics service receives a render tree from a client (601). Optionally, the render tree is optimized (602). Then a hash function is computed on the optimized render tree (603). This hash value is compared to the hash values of the most recently used render trees (604). If a match is found (605), then the previously used fragment program is retrieved from the cache (606) and executed (608). If no match is found (605) a new fragment program is generated and compiled (607) and then executed (608). The recently used cache is then updated (609) and the process repeats.

Additionally, although the steps are illustrated in sequence, it is possible for the process to be executed in multiple threads. In such an embodiment, an additional render tree may be received contemporaneously with the receipt of a first render tree or before the fragment program (whether generated or retrieved) is executed and the cache updated. In such a case, the basic sequence of operations is the same. Additionally, it is possible that the multiple threads may each have their own cache, or they may share a cache.

Figure 6:
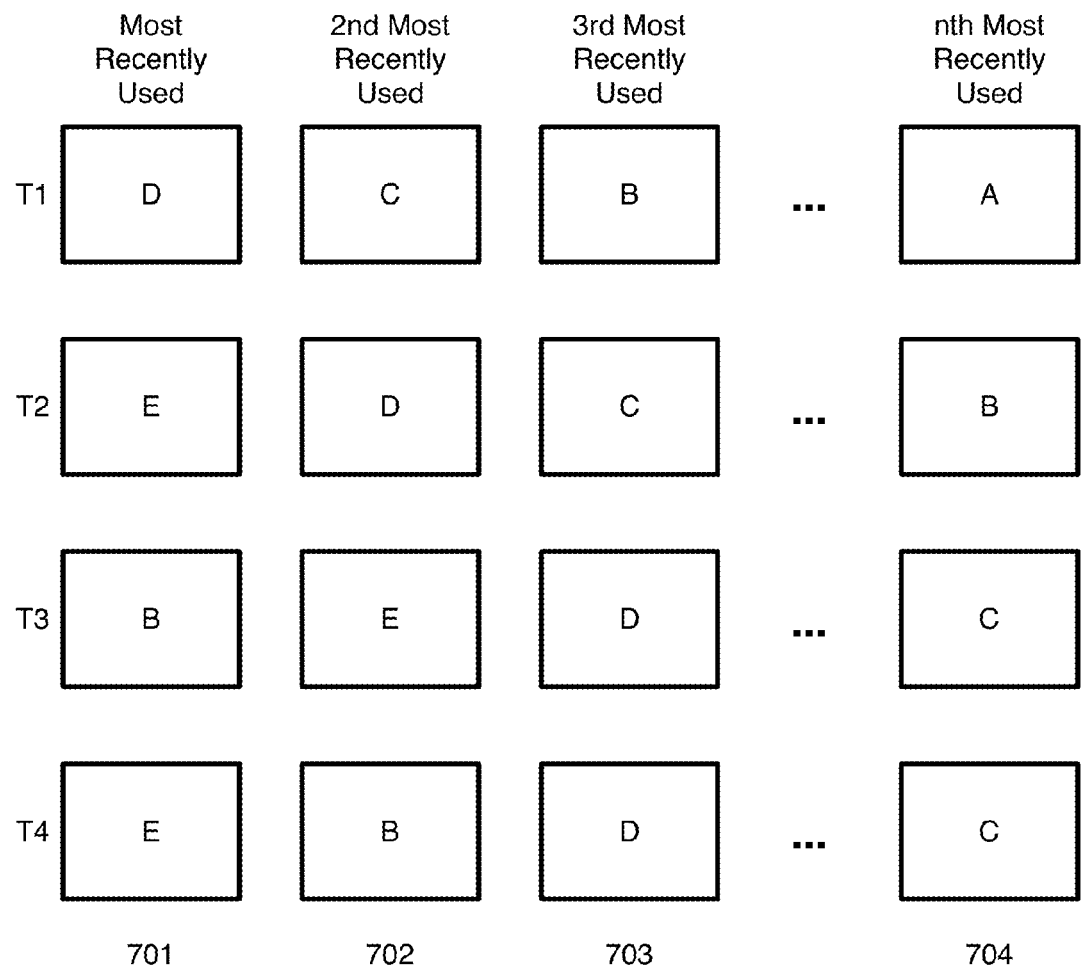
FIG. 6 is a diagram illustrating a cache management routine for use with the render tree caching method, such as that illustrated in FIG. 5.

FIG. 6 is a diagram illustrating the sequence of events in operation of the recently used tree cache. Column 701 represents a cache location corresponding to a most recently used fragment program. Columns 702, 703, and 704 represent cache locations corresponding to second, third, and nth most recently used fragment programs respectively. Rows T1-T4 represent sequential time events in which a render tree is received from a client. Alphabetic characters A-E are used to refer to the fragment programs and their corresponding hash values. Operation is as follows:

At time T1, most recently used fragment program D and the hash value of the corresponding render tree are stored in cache location 701. Similarly, second, third, and nth most recently used fragment programs C, B, and A, along with their corresponding hash values, are stored in cache locations 702, 703, and 704, respectively. Also at time T1, the graphics service receives a new render tree. After performing the optimization and hash computation processes described above, it is determined that a new fragment program is required, i.e., there is no cached fragment program corresponding to the received render tree. Thus, a new fragment program E is generated, compiled and executed. The new fragment program and the hash value of the corresponding render tree are then stored in most recently used cache location 701, and each of the previously used fragment programs are "demoted" one level within the cache. Thus fragment program D, which was most recently used is now second most recently used, etc. Nth most recently used fragment program A from time T1 is deleted from the cache.

At time T2, following T1, another render tree is received from the client by the graphics service. After optimization and hash computation, it is determined that nth most recently used fragment program B corresponds to the newly received render tree. Thus fragment program B is retrieved and executed. Additionally, fragment program B and the hash value of the corresponding render tree are stored in most recently used cache location 701. As before, fragment programs E, D, and C, are "demoted" one level within the cache. However, because a cached fragment program was reused, no fragment programs are dropped.

Similarly at time T3, following T2, another render tree is received, and it is determined that this render tree corresponds to second most used fragment program E. Thus, E is retrieved and executed and the most recently used cache location 701 is updated to include fragment program E and the corresponding hash value. Also, fragment program B and its corresponding hash value are demoted to second most recently used cache location 702. Because third most recently used fragment program D through nth most recently used fragment program C are still the third through nth most recently used programs, they remain in their previously assigned cache locations.

Although the foregoing description of the cache management techniques is discussed in terms of moving cached fragment programs and their corresponding hash values among cache locations, as noted above it is also possible to accomplish such result without moving items within the memory, instead relying on techniques such as changing pointers, etc. Any memory management technique suitable for creating a least recently used type of arrangement is suitable. Additionally, any of the foregoing techniques can be implemented in a variety of hardware/software configurations, including those described above. While various examples of such hardware/software configurations have been given, there are many more possibilities that are also intended to fall within the scope of the appended claims. Additionally, the concepts described herein may be implemented in systems, including hardware, software, and/or combinations thereof, methods performed by such systems, or non-transitory computer readable media having instructions for performing such methods stored therein. Any and all of these combinations are intended to fall within the bounds of the following claims appropriately construed.

The invention claimed is:

1. A method of caching fragment programs for rendering images on a graphics processing unit, comprising:
   receiving a render tree specifying one or more filters to be applied to an image, each filter corresponding to a node of the render tree, and one or more parameters for those filters;
   computing a hash value of the render tree by applying a hash function to the nodes of the render tree but not to the parameters;
   comparing the computed hash value to one or more hash values corresponding to one or more cached, previously compiled fragment programs for execution on a graphics processing unit to determine whether a cached fragment program corresponding to the render tree is available; and
   when a cached fragment program corresponding to the render tree is available, retrieving the cached fragment program, passing the parameters to the retrieved cached fragment program, and executing the retrieved cached fragment program to perform a render; and
   when a cached fragment program corresponding to the render tree is not available, generating, compiling, and executing a new fragment program to perform the render and caching the new fragment program.

2. The method of claim 1 wherein the render tree is optimized prior to computing the hash value.

3. The method of claim 1 further comprising displaying an image generated by the render.

4. The method of claim 1 wherein the hash function is sensitive to the order of application of the filters.

5. The method of claim 1 wherein the method is performed by an operating system service.

6. The method of claim 1 wherein the hash function is an MD5 hash function.

7. The method of claim 1 wherein caching the new fragment program comprises using a least recently used cache arrangement.

8. A method of caching fragment programs for rendering images with a graphics processing unit, comprising:
   receiving a render tree specifying one or more filters to be applied to an image;
   determining whether a cached fragment program corresponding to the render tree is available from a cache; and
   when a cached fragment program corresponding to the render tree is available, executing the cached fragment program to render at least a portion of the image, and updating the cache to indicate the cached fragment program corresponding to the render tree is a most recently used cached fragment program; and when a cached fragment program corresponding to the render tree is not available, generating, compiling, and executing a new fragment program to perform the render and updating the cache to indicate the new fragment program is a most recently used cached fragment program and deleting a least most recently used fragment program from the cache.

9. The method of claim 8 wherein updating the cache to indicate the most recently used cached fragment program comprises storing the fragment program used to render in a predetermined memory location.

10. The method of claim 8 wherein updating the cache to indicate the most recently used cached fragment program comprises updating a pointer to indicate a memory location storing the most recently used cached fragment program.

11. The method of claim 8 wherein determining whether a cached fragment program corresponding to the render tree is available from a cache comprises:

computing a hash value of the render tree by applying a hash function to nodes of the render tree but not to parameters; and comparing the computed hash value to one or more hash values corresponding to one or more cached, previously compiled fragment programs for execution on a graphics processing unit.

12. A system for caching fragment programs for rendering images on a graphics processing unit, comprising:

a display;

at least one processing device operatively coupled to the display; and a memory operatively coupled to the at least one processing device, the memory storing computer readable instructions for execution by the at least one processing device to cause the system to:

receive a render tree specifying one or more filters to be applied to an image;

compute a hash value of the render tree by applying a hash function to the render tree;

compare the computed hash value to one or more hash values corresponding to one or more cached, previously compiled fragment programs for execution on a graphics processing unit to determine whether a cached fragment program corresponding to the render tree is available; and when a cached fragment program corresponding to the render tree is available, retrieve the cached fragment program and execute the retrieved cached fragment program to render at least a portion of the image; and when a cached fragment program corresponding to the render tree is not available, generate, compile, and execute a new fragment program to render at least a portion of the image and cache the new fragment program; and cause at least a portion of the rendered image to be displayed on the display.

13. The system of claim 12 wherein:

each filter of the render tree corresponds to a node of the render tree;

the render tree further specifies one or more parameters for one or more of the filters of the render tree; and wherein the hash function applied to the render tree is applied to the nodes of the render tree but not to the parameters.

14. The system of claim 12 wherein the at least one processing device comprises at least one central processing unit and at least one graphics processing unit.

15. The system of claim 14 wherein the at least one central processing unit and the at least one graphics processing unit are integrated in a system on a chip.

16. The system of claim 12 wherein the computer readable instructions for execution by the at least one processing device further comprise instructions to cause the system to optimize the render tree prior to computing the hash value of the render tree.

17. The system of claim 12 wherein the computer readable instructions for execution by the at least one processing device further comprise instructions to cause the system to:

update the cache to indicate a most recently used fragment program; and when the most recently used fragment program corresponds to the new fragment program, remove a least most recently used fragment program from the cache; and when the most recently used fragment program corresponds to a previously cached fragment program, reorder the cache to indicate the sequence of most recently used fragment programs.

18. The system of claim 17 wherein the computer readable instructions for execution by the at least one processing device cause the system to update the cache by storing the most recently used fragment program in predetermined locations.

19. The system of claim 17 wherein the computer readable instructions for execution by the at least one processing device cause the system to update the cache by updating a pointer to a location of the most recently used fragment program.

20. A non-transitive computer readable storage medium having embodied thereon instructions executable by a computer system comprising a processor, a memory, and a display to cause the computer system to:

compute a hash value of a render tree by applying a hash function to the nodes of the render tree;

compare the computed hash value to one or more hash values corresponding to one or more cached, previously compiled fragment programs for execution on a graphics processing unit to determine whether a cached fragment program corresponding to the render tree is available; and when a cached fragment program corresponding to the render tree is available, retrieve and execute the retrieved cached fragment program to perform a render; and when a cached fragment program corresponding to the render tree is not available, generate, compile, and execute a new fragment program to perform the render.

21. The non-transitive computer readable storage medium of claim 20 wherein the instructions further cause the computer system to optimize the render tree.

22. The non-transitive computer readable storage medium of claim 20 wherein the instructions further cause the computer system to display an image generated by the render.

23. The non-transitive computer readable storage medium of claim 20 wherein the instructions further cause the computer system to update a cache of recently used fragment programs by:

when a cached fragment program corresponding to the render tree is used, updating the cache to indicate a most recently used cached fragment program; and when a new fragment program is generated, updating the cache to indicate a most recently used fragment program by storing the new fragment program and deleting a least most recently used fragment program from the cache.

24. The non-transitive computer readable storage medium of claim 23 wherein the instructions cause the computer system to update the cache to indicate the most recently used cached fragment program by causing the computer system to store the fragment program in a predetermined memory location.

25. The non-transitive computer readable storage medium of claim 23 wherein the instructions cause the computer system to update the cache to indicate the most recently used cached fragment program by causing the computer system to update a pointer to indicate a memory location storing the most recently used cached fragment program.

* * * * *